(12) United States Patent
Breternitz et al.

(10) Patent No.: US 9,116,703 B2
(45) Date of Patent: Aug. 25, 2015

(54) SEMI-STATIC POWER AND PERFORMANCE OPTIMIZATION OF DATA CENTERS

(71) Applicant: Advanced Micro Devices, Inc., Sunnyvale, CA (US)

(72) Inventors: Mauricio Breternitz, Austin, TX (US); Leonardo Piga, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 204 days.

(21) Appl. No.: 13/651,904

(22) Filed: Oct. 15, 2012

(65) Prior Publication Data

US 2014/0108828 A1    Apr. 17, 2014

(51) Int. Cl.
  *G06F 1/32*  (2006.01)
  *G06F 9/50*  (2006.01)
  *G06T 7/20*  (2006.01)

(52) U.S. Cl.
  CPC .............. *G06F 1/329* (2013.01); *G06F 9/5094* (2013.01); *G06F 2209/501* (2013.01); *Y02B 60/142* (2013.01); *Y02B 60/144* (2013.01)

(58) Field of Classification Search
  None
  See application file for complete search history.

(56) References Cited

U.S. PATENT DOCUMENTS

| 7,039,766 | B1 * | 5/2006 | Smith | 711/137 |
| 2003/0204576 | A1 * | 10/2003 | Yamada et al. | 709/220 |
| 2007/0074011 | A1 | 3/2007 | Borkar et al. | |
| 2008/0162965 | A1 * | 7/2008 | Marinas et al. | 713/320 |
| 2009/0150893 | A1 * | 6/2009 | Johnson et al. | 718/104 |
| 2010/0017042 | A1 * | 1/2010 | Lopata | 700/286 |

FOREIGN PATENT DOCUMENTS

WO    WO 2008/110423    3/2007

OTHER PUBLICATIONS

Piga, Leonardo, et al., "Empirical Web Server Power Modeling and Characterization", Institute of Computing, UNICAMP, Brazil, 2011, IEEE 978-I-4577-2064, Feb. 2011, p. 75.
Yigitbasi, Nezih, et al., "Energy Efficient Scheduling of Mapreduce Workloads on Heterogeneous Clusters", Dec. 12, 2011, 6 pages.
Barroso, Lutz Andre, et al., "The Case for Energy-Proportional Computing", IEEE Computer Society, Dec. 2007, pp. 33-37.
Fan, Xiaobo, et al., "Power Provisioning for a Warehouse-Sized Computer", ISCA '07, Jun. 9-13, 2007, San Diego, CA, pp. 13-23.
Bergamaschi, Reinaldo, et al., "Modeling, Simulation and Optimization of Power and Performance of Data Centers", Institute of Computing, Campinas State University (UNICAMP), Campinas, Brazil, MOBS-2011, 6 pages.
Notification of transmittal of the International Search Report and the Written Opinion of the International Searching Authority, or the Declaration corresponding to PCT/US2013/063836 mailed Jan. 22, 2014, 9 pages.

* cited by examiner

*Primary Examiner* — Emerson Puente
*Assistant Examiner* — Jonathan R Labud
(74) *Attorney, Agent, or Firm* — Harrity & Harrity, LLP

(57) ABSTRACT

A device may receive information that identifies a first task to be processed, may determine a performance metric value indicative of a behavior of a processor while processing a second task, and may assign, based on the performance metric value, the first task to a bin for processing the first task, the bin including a set of processors that operate based on a power characteristic.

25 Claims, 11 Drawing Sheets

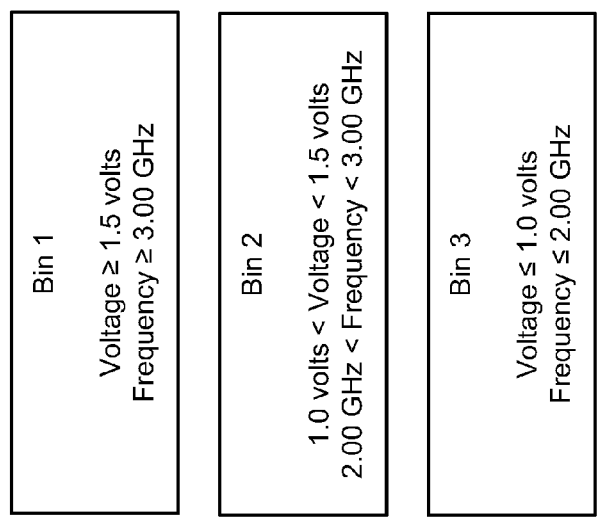
FIG. 6A

SEMI-STATIC POWER AND PERFORMANCE OPTIMIZATION OF DATA CENTERS

TECHNICAL FIELD

The disclosed embodiments relate generally to data centers. In particular, the disclosed embodiments relate to optimizing semi-static power and performance of data centers.

BACKGROUND

A data center is a facility used to house computer systems, such as servers, and associated components, such as telecommunications and storage systems. A data center may contain a set of routers and switches that transport traffic between the servers and to or from computers outside of the data center. A data center may be used to run applications that handle various computer related aspects of a business and/or store data of an organization or multiple organizations.

SUMMARY OF EMBODIMENTS OF AN INVENTION

According to an embodiment of certain aspects of the present invention, a device receives information that identifies a first task to be processed, determines a performance metric value indicative of a behavior of a processor while processing a second task, and assigns, based on the performance metric value, the first task to a bin for processing the first task, the bin including a set of processors that operate based on a power characteristic.

According to some embodiments, a device receives information that identifies a task to be processed, determines a performance metric value associated with processing the task, and assigns, based on the performance metric value, the task to a first bin of processors for processing the task, the first bin of processors having a power characteristic in common.

According to some embodiments, a device may determine a first power characteristic value at which a processor is capable of operating, where the first power characteristic value includes one of a voltage supplied to the processor, or a frequency at which the processor operates. The device may determine a range of second power characteristic value associated with bins, where each bin includes a group of processors operating using a particular power characteristic value. The device may assign the processor to a bin by adjusting the first power characteristic value of the processor so that it falls within the range of the second power characteristic value associated with the bin.

BRIEF DESCRIPTION OF THE DRAWINGS

FIGS. 6A and 6B are diagrams of example embodiments relating to the example process illustrated in FIG. 5;

DETAILED DESCRIPTION OF EXEMPLARY EMBODIMENTS

The following detailed description of example embodiments refers to the accompanying drawings. The same reference numbers in different drawings may identify the same or similar elements.

Data centers often include many computers that require a large amount of power to run, resulting in high energy costs. Energy costs may be reduced by effectively managing the amount of power consumed by the computers in a data center. A factor that contributes to computer power consumption is the power used by each computer processor in the data center. The amount of power used by a processor depends on processor power characteristics, such as a voltage supplied to the processor and/or the frequency at which the processor operates. In other embodiments, a processor's power characteristics depend on the amount of power consumed (or predicted to be consumed) by the processor for performing a task or a certain type of task or processing. Processor power characteristics may be dynamically adjusted based on the processing power required to perform processing tasks. Embodiments described herein may reduce energy costs of a data center by managing power characteristics of data center processors based on the processing tasks that must be performed by the processors.

As used herein, a "bin" may refer to a set of one or more processors. For example, a bin may include a set of processors with the same or similar power characteristics. According to some embodiments described herein, processors in a data center may be grouped into bins based on the power characteristics of the processors. A data center may include one or more bins. Assigning a task to a bin may include assigning the task to a processor included in the bin.

Figure 1:
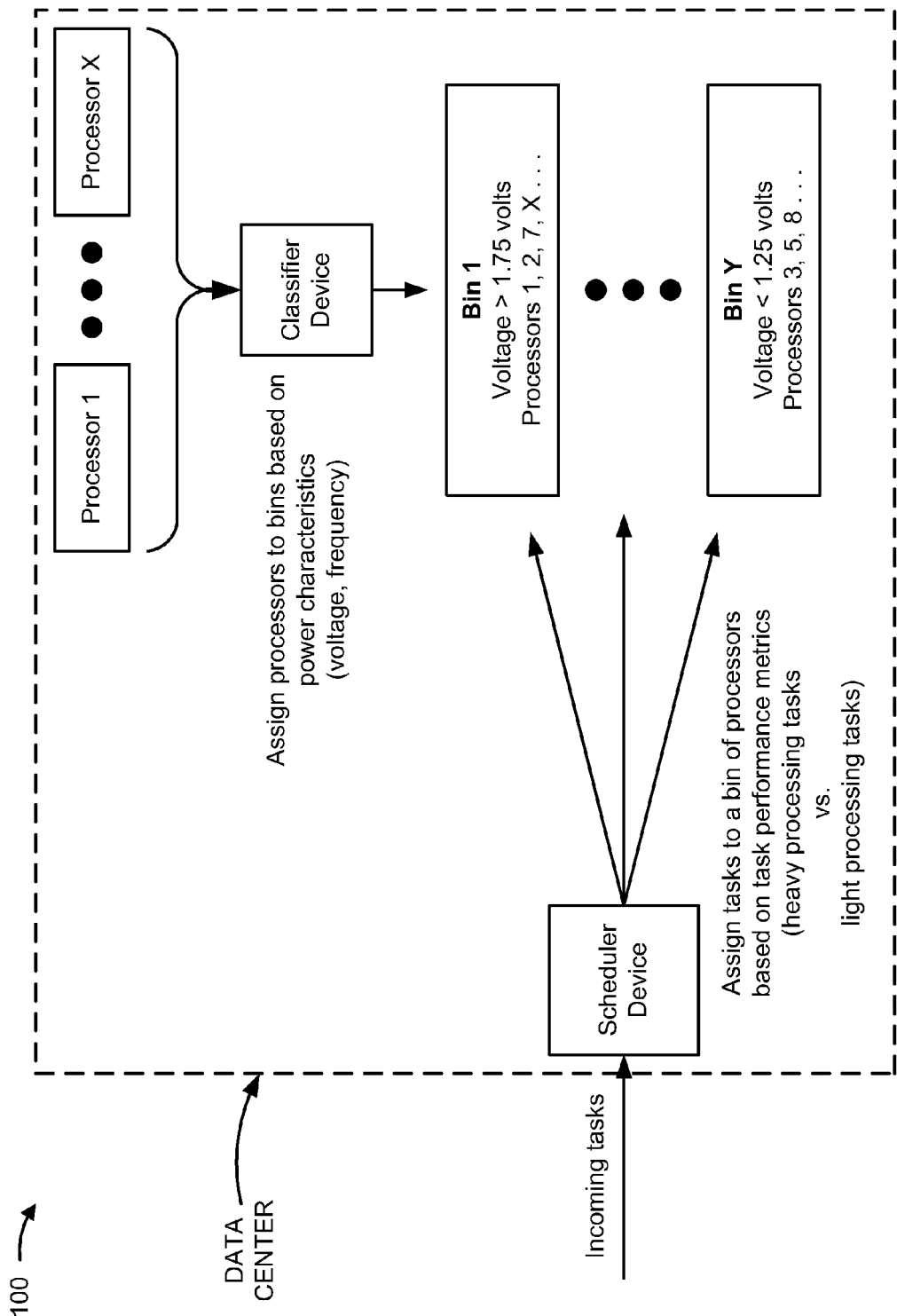
FIG. 1 is a diagram of an overview of an example embodiment described herein.

FIG. 1 is a diagram of an overview of an example embodiment 100 described herein. As illustrated in FIG. 1, embodiment 100 may include a data center, which may include multiple processors, multiple bins, a classifier device, and a scheduler device. In some embodiments, the classifier device and the scheduler device may be components of a computing system (e.g., a management device) in communication with the processors of the data center.

As illustrated in FIG. 1, the classifier device may determine power characteristics of each processor, such as a voltage supplied to each processor or a frequency at which each processor operates (e.g., 2.00 gigahertz ("GHz")). In some embodiments, the classifier device may also adjust the voltage or the frequency associated with each processor. The classifier device may assign each processor to a bin based on the power characteristics of the processor. For example, Bin 1 may include processors being supplied with more than 1.75 volts, and Bin Y (Y>1) may include processors being supplied with less than 1.25 volts, as illustrated.

As noted above, other power characteristics of, or related metrics to, processors may be used to assign a processor to a bin. For example, a processor may be assigned to a bin based on the power consumed (or predicted to be consumed) by the processor to carry out a task, instruction or type of task or instruction, for example. In such exemplary embodiments, a singular processor may be assigned to multiple bins based on the type of task or instruction. For example, a singular processor may be capable of performing more than one type of task such as sequential task processing and parallel task processing (video encoding is one example of a task that is highly parallel in nature). In the first instance, the processor may consume very significant amounts of power performing sequential task processing (relative to another and different type of processor) while consuming very little amounts of power performing parallel task processing (again, relative to another and different type of processor). This exemplary processor may then be associated with a first bin for sequential processing tasks and also be associated with a different and second bin for parallel processing tasks.

As further illustrated in FIG. 1, the scheduler device may receive incoming tasks that the processors of the data center are to perform. The scheduler device may classify each task using one or more task performance metrics that indicate whether a task requires heavy processing power or light processing power. The scheduler device may assign a task to a bin based on the classification. For example, tasks requiring a large amount of processing power (e.g., greater than a threshold amount) may be assigned to Bin 1, which includes processors supplied with higher voltages than the processors included in Bin Y. Likewise, tasks requiring a small amount of processing power (e.g., less than a threshold amount) may be assigned to Bin Y. In this way, the processors of the data center may be utilized more efficiently, and may decrease the amount of power needed to run the data center.

Figure 2:
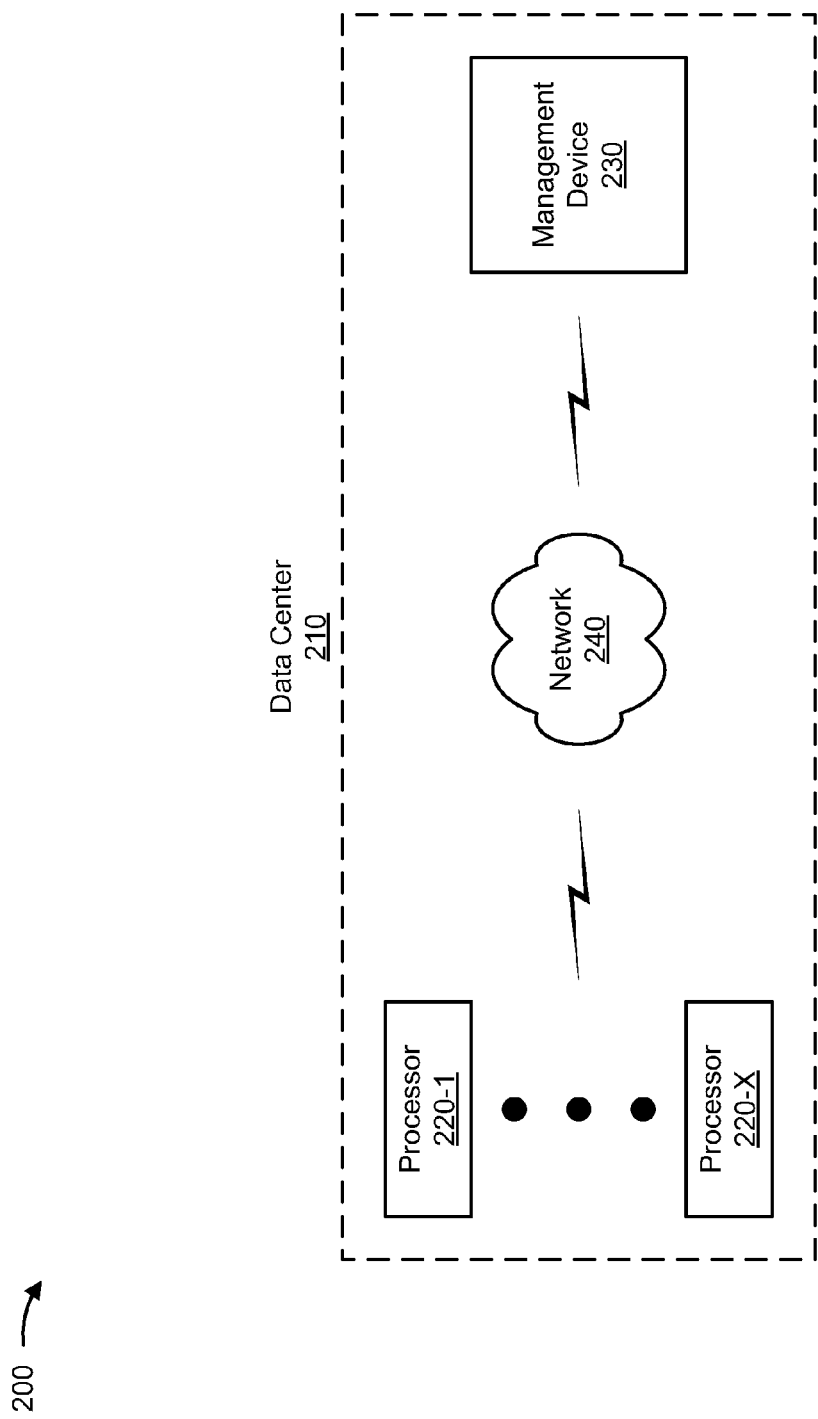
FIG. 2 is a diagram of an example environment in which embodiments described herein may be implemented, according to some embodiments.

FIG. 2 is a diagram of an example environment 200 in which embodiments described herein may be implemented, according to some embodiments. As illustrated in FIG. 2, environment 200 may include a data center 210, a set of processors 220-1 through 220-X (X≥1) (hereinafter referred to collectively as "processors 220," and individually as "processor 220"), a management device 230, and a network 240.

Data center 210 may include one or more computing devices, such as one or more servers, that include one or more processors 220. In some embodiments, data center 210 includes other devices in communication with the computing devices and/or processors 220, such as telecommunications devices, storage devices, and/or data center management devices, such as management device 230. In some embodiments, data center 210 includes one or more traffic transfer devices (e.g., a router, a switch, a gateway, a hub, a modem, a firewall, a network interface card, a bridge, an optical add/drop multiplexer, etc.) that transport traffic among the computing devices and/or processors 220 included in data center 210. Additionally, or alternatively, the one or more traffic transfer devices may transport traffic to and/or from computing devices not included in data center 210. Devices included in data center 210 may communicate via network 240.

Processor 220 may include a processor, a microprocessor, and/or any processing logic (e.g., a field-programmable gate array ("FPGA"), an application-specific integrated circuit ("ASIC"), etc.) that interprets and/or executes instructions. In some embodiments, processor 220 includes one or more processor cores. In some embodiments, processor 220 receives an instruction, a signal, and/or a processing task from a device, such as management device 230. Processors 220 may communicate with one another and/or with management device 230 via a network, such as network 240. As used herein, processor 220 may refer to a device that includes processor 220, such as a computing device (e.g., a computer, a server, etc.). In some embodiments, two or more of processors 220 may be identical processors (e.g., the same type of microchip) with adjustable power characteristics.

Management device 230 may include one or more devices that gather, process, search, store, and/or provide information in a manner described herein. In some embodiments, management device 230 includes one or more computing devices, such as one or more servers, that may manage processors 220. Additionally, or alternatively, management device 230 may include one or more traffic transfer devices (e.g., a router, a switch, a gateway, a hub, a modem, a firewall, a network interface card, a bridge, an optical add/drop multiplexer, etc.) that transport traffic among processors 220 and/or between processors 220 and devices not included in data center 210.

In some embodiments, management device 230 classifies processors 220 into bins based on power characteristics of processors 220. Additionally, or alternatively, management device 230 may assign a task to a processor 220 included in a particular bin based on a task performance metric.

While illustrated as being located internal to data center 210, management device 230 may be implemented external to data center 210 in some embodiments. Additionally, or alternatively, while illustrated as being separate from processors 220, management device 230 may be integrated into (and a part of) processors 220 and/or one or more computing devices housing processors 220.

Network 240 may include may include one or more wired and/or wireless networks. For example, network 240 may include a wired network (e.g., that interconnects devices using a coaxial cable, a twisted pair cable, a serial bus, a parallel bus, a power line, etc.), a wireless network (e.g., a radio transmission network such as a short-wavelength radio link, a long-wavelength radio link, Bluetooth, WiFi, etc.; a network that operates using an Institute of Electrical and Electronics Engineers ("IEEE") standard, such as 802.11 wireless standards; etc.), a local area network ("LAN"), a wide area network ("WAN"), a metropolitan area network ("MAN"), a telephone network, an ad hoc network, an intranet, the Internet, a fiber optic-based network, and/or a combination of these or other types of networks.

The number of devices and/or networks illustrated in FIG. 2 is provided for explanatory purposes. In practice, there may be additional devices and/or networks, fewer devices and/or networks, different devices and/or networks, or differently arranged devices and/or networks than those illustrated in FIG. 2. Furthermore, two or more of the devices illustrated in FIG. 2 may be implemented within a single device, or a single device illustrated in FIG. 2 may be implemented as multiple, and possibly distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
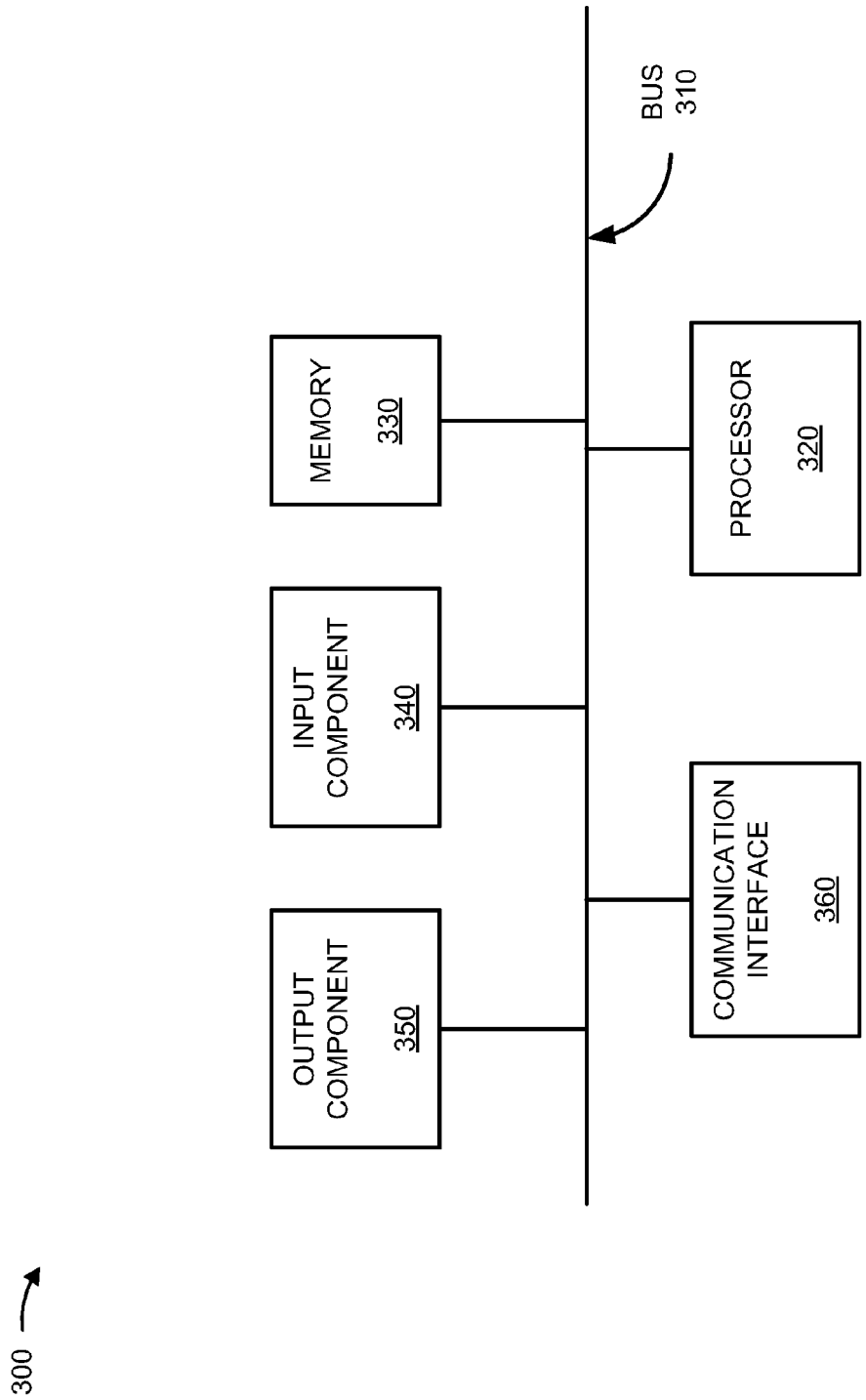
FIG. 3 is a diagram of example components of a device in which systems and/or methods described herein may be implemented, according to some embodiments.

FIG. 3 is a diagram of example components of a device 300 in which systems and/or methods described herein may be implemented, according to some embodiments. In some embodiments, device 300 corresponds to management device 230. Additionally, or alternatively, device 300 may correspond to a computing device that includes processor 220. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that interprets and/or executes instructions. In some embodiments, processor 320 includes one or more processor cores. In some embodiments, processor 320 corresponds to processor 220. Memory 330 may include a random access memory ("RAM"), a read only memory ("ROM"), and/or any type of dynamic or static storage device (e.g., a flash, magnetic, or optical memory) that stores information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information from device 300 (e.g., a display, a speaker, one or more light-emitting diodes ("LEDs"), etc.).

Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include a mechanism for communicating with another device and/or system via a network, such as network 240. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, embodiments described herein are not limited to any specific combination of hardware circuitry and software.

The number of components illustrated in FIG. 3 is provided for explanatory purposes. In practice, device 300 may include additional components, fewer components, different components, or differently arranged components than those illustrated in FIG. 3. Additionally, or alternatively, each of management device 230 and/or a computing device that includes processor 220 may include one or more devices 300 and/or one or more components of device 300.

Figure 4:
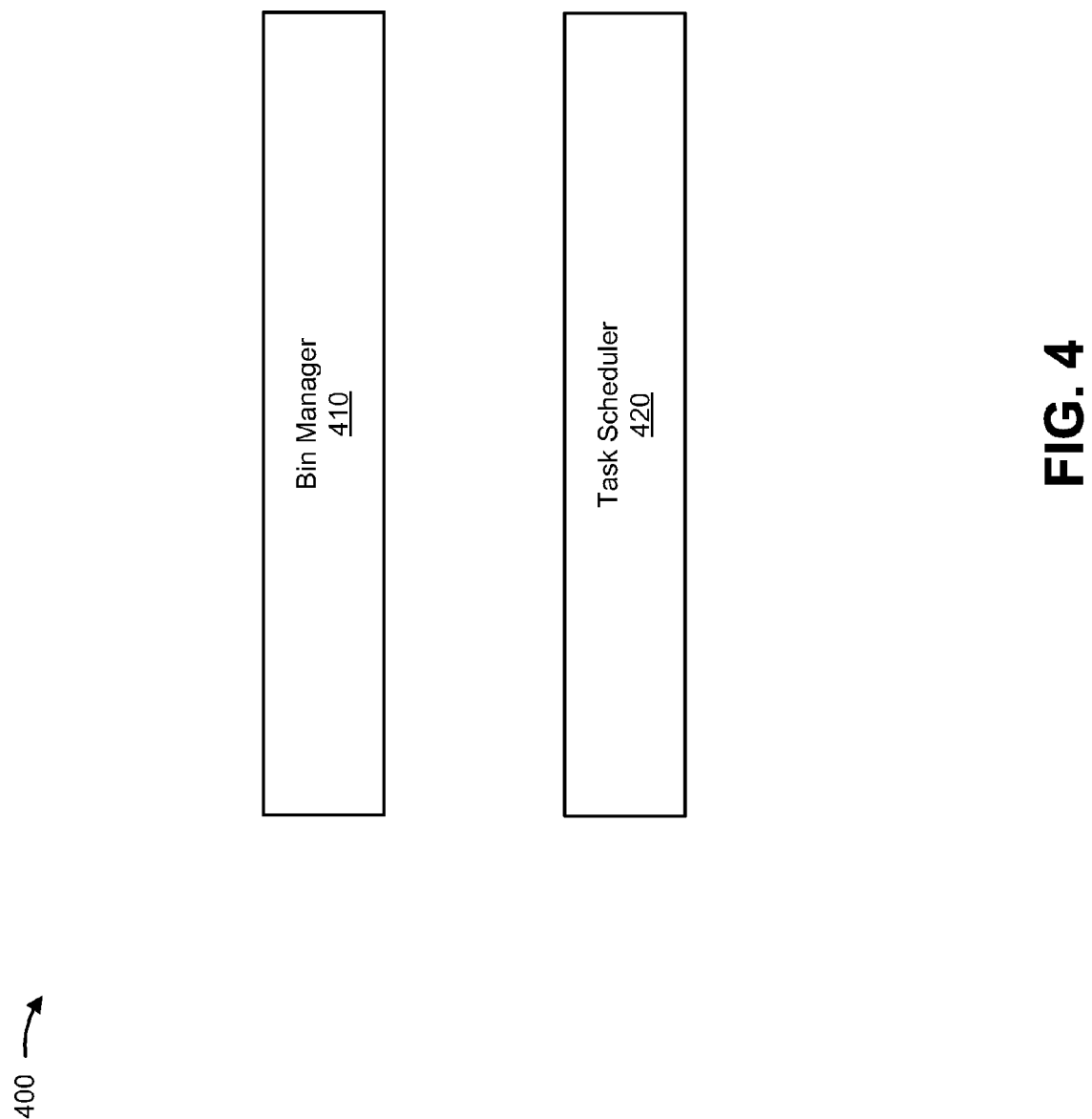
FIG. 4 is a diagram of example functional components of a device in which the embodiments described herein may be implemented, according to some embodiments.

FIG. 4 is a diagram of example functional components of a device 400 that may correspond to management device 230, according to some embodiments. In some embodiments, one or more of the functional components of device 400 may be implemented by another device or a collection of devices including or excluding management device 230. As illustrated, device 400 may include a bin manager 410 and a task scheduler 420.

Bin manager 410 may perform operations associated with assigning processors 220 to a bin. Recall that a bin may include a set of processors 220 with the same or similar power characteristics. In some embodiments, bin manager 410 groups processors 220 into bins based on the power characteristics of processors 220, as described further in connection with FIGS. 5 and 6. Additionally, or alternatively, bin manager 410 may determine a quantity of processors 220 to include in a bin based on a bin utilization, and may assign processors 220 to bins based on the bin utilization, as described further in connection with FIGS. 7 and 8.

Task scheduler 420 may perform operations associated with assigning a task to a bin and/or a processor 220 for processing the task. In some embodiments, task scheduler 420 assigns the task to a bin and/or a processor 220 for processing the task based on a task performance metric, as described further in connection with FIGS. 9 and 10.

The number of functional components illustrated in FIG. 4 is provided for explanatory purposes. In practice, there may be additional functional components, fewer functional components, or different functional components than those illustrated in FIG. 4. Functional components 410-420 may be implemented using one or more devices 300 or one or more components of device 300. Management device 230 may individually include all of the functional components depicted in FIG. 4, or the functional components depicted in FIG. 4 may be distributed singularly or duplicatively in any manner between the devices described in connection with FIG. 2.

Figure 5:
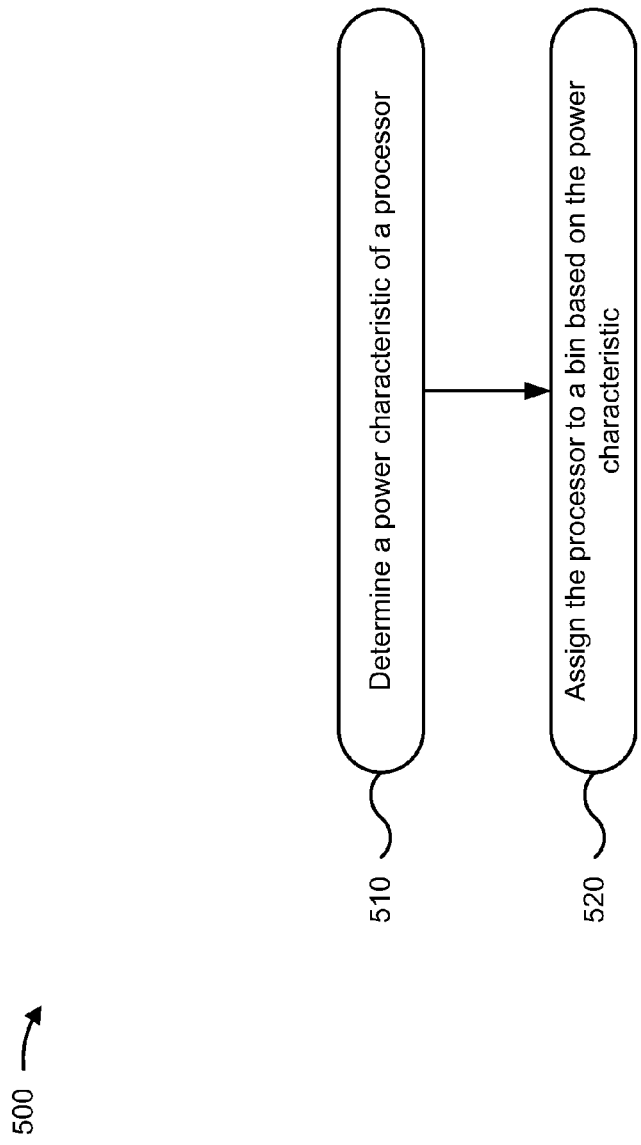
FIG. 5 is a diagram of an example process for assigning processors to bins, according to some embodiments.

FIG. 5 is a diagram of an example process 500 for assigning processors to bins, according to some embodiments. In some embodiments, one or more process blocks of FIG. 5 may be performed by one or more components of management device 230. Additionally, or alternatively, one or more process blocks of FIG. 5 may be performed by one or more components of another device or a collection of devices including or excluding management device 230.

As illustrated in FIG. 5, process 500 may include determining a power characteristic of a processor (block 510). In some embodiments, bin manager 410 queries processor 220 regarding a power characteristic, and receives information that identifies the power characteristic from processor 220. The power characteristic may include and/or may be based on a voltage supplied to and/or used by processor 220 (e.g., measured in volts), a frequency at which processor 220 operates (e.g., a clock rate, such as 1.33 GHz, 2.00 GHz, 3.66 GHz, 1.00 terahertz ("THz"), etc.), an electrical current drawn by processor 220 (e.g., measured in amperes), a power of processor 220 (e.g., a rate at which energy is used by processor 220, which may be measured in watts), an electrical capacitance of processor 220 (e.g., measured in farads), an electrical resistance experienced by an electrical current at processor 220 (e.g., measured in ohms), a temperature of processor 220 (e.g., measured in degrees Celsius, kelvins, etc.) and/or any other parameter that may indicate an amount of power consumed by processor 220.

In some embodiments, bin manager 410 uses one or more power characteristics to derive another power characteristic. For example, bin manager 410 may calculate an average of a power characteristic measured at periodic intervals over a time period. For example, processor 220 may be supplied with a voltage of 1.2 volts at time T=1, and may be supplied with a voltage of 1.4 volts at time T=2, for an average voltage of 1.3 volts. As another example, bin manager 410 may calculate power (e.g., in watts) by multiplying voltage (e.g., in volts) and current (e.g., in amperes). In some embodiments, bin manager 410 may perform a mathematical operation on one or more power characteristics to calculate a power characteristic score for processor 220. For example, bin manager 410 may multiply a voltage supplied to processor 220 (e.g., 1.4 volts) by a frequency of processor 220 (e.g., 2.0 GHz) to derive a power characteristic score for processor 220 (e.g., 1.4×2.0=2.8).

As further illustrated in FIG. 5, process 500 may include assigning the processor to a bin based on the power characteristic (block 520). In some embodiments, each bin is associated with a particular set of power characteristics, and bin manager 410 may assign processor 220 to a bin that matches the power characteristics of processor 220. In some embodiments, bin manager 410 uses one or more thresholds to assign a processor 220 to a bin. For example, processors 220 receiving a voltage greater than or equal to 1.75 volts may be assigned to a first bin, processors 220 receiving a voltage less than 1.75 volts and greater than 1.25 volts may be assigned to a second bin, and processors 220 receiving a voltage less than or equal to 1.25 volts may be assigned to a third bin. Bin manager 410 may use any quantity of thresholds to assign processors 220 to bins. In some embodiments, every processor 220 included in a particular bin may have the same power characteristics (e.g., the same voltage, the same frequency, etc.).

In some embodiments, bin manager 410 assigns a processor 220 to a bin by setting the power characteristics of the processor 220 to match the power characteristics of the processors 220 included in the bin. In some embodiments, a processor 220 is capable of operating at multiple power states (e.g., at a particular voltage, frequency, etc.). For example, processor 220 may be able to operate with a supplied voltage anywhere between 1 volts and 2 volts. As another example, processor 220 may be able to operate at 1.00 GHz, 1.50 GHz, or 2.00 GHz. Bin manager 410 may assign a processor 220 to a bin by adjusting the power characteristics of the processor 220, based on the power states in which processor 220 is capable of operating.

For example, Bin Y may include processors 220 with a supplied voltage of 1.25 volts. Bin manager 410 may assign a particular processor 220 to Bin Y by setting the supplied voltage of the particular processor to 1.25 volts. Additionally, or alternatively, Bin Y may include processors 220 with an operating frequency of 1.00 GHz, and bin manager 410 may assign a particular processor 220 by setting the operating frequency of the particular processor to 1.00 GHz.

Figure 6B:
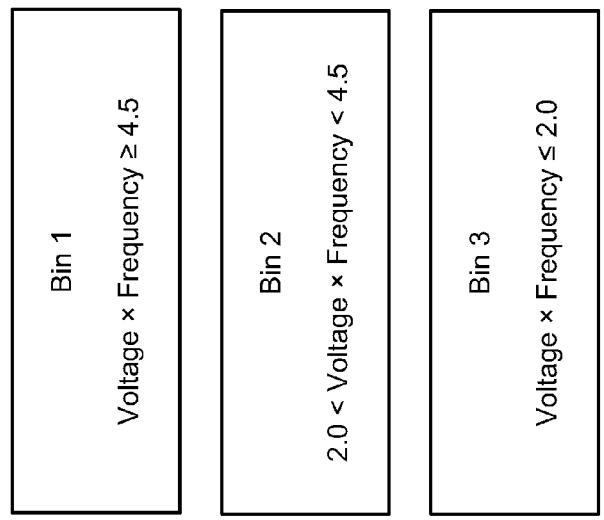

In some embodiments, bin manager 410 uses multiple power characteristics when assigning processors 220 to bins, as described further in connection with FIG. 6A. Additionally, or alternatively, bin manager 410 may use a derived power characteristic and/or a power characteristic score to assign processors 220 to bins, as described further in connection with FIG. 6B.

While a series of blocks has been described with regard to FIG. 5, the order of the blocks may be modified in some embodiments. Additionally, or alternatively, non-dependent blocks may be performed in parallel.

FIGS. 6A and 6B are diagrams of example embodiments 600 relating to example process 500, illustrated in FIG. 5. FIG. 6A is a diagram of an example embodiment for assigning a processor to a bin using multiple power characteristics, according to some embodiments. FIG. 6B is a diagram of an example embodiment for assigning a processor to a bin using a power characteristic score, according to some embodiments.

As illustrated in FIG. 6A, bin manager 410 may assign a processor 220 to one of three bins depending on the voltage supplied to processor 220 and the frequency at which processor 220 operates. For example, processors 220 that receive a voltage greater than or equal to 1.5 volts, and/or that operate at a frequency greater than or equal to 3.00 GHz, may be assigned to Bin 1, as illustrated. Similarly, processors 220 that receive a voltage greater than 1.0 volts and less than 1.5 volts, and/or that operate at a frequency greater than 2.00 GHz and less than 3.00 GHz, may be assigned to Bin 2, as illustrated. Finally, processors 220 that receive a voltage less than or equal to 1.0 volts, and/or that operate at a frequency less than or equal to 2.00 GHz, may be assigned to Bin 3, as illustrated.

The quantity of bins, the quantity of power characteristics, the quantity of thresholds, the threshold values, and the particular power characteristics illustrated in FIG. 6A are provided as an example. In some embodiments, bin manager 410 uses a different quantity of bins, a different quantity of power characteristics, a different quantity of thresholds, different threshold values, and/or different power characteristics than those illustrated in FIG. 6A. In some embodiments, bin manager 410 receives input from a user to determine the quantity of bins, the quantity of power characteristics, the quantity of thresholds, the threshold values, and/or the particular power characteristics used to assign processors 220 to bins.

As illustrated in FIG. 6B, bin manager 410 may calculate a power characteristic score based on power characteristics of processor 220, and may use the power characteristic score to assign processor 220 to one of three bins. For example, bin manager 410 may multiply a voltage supplied to processor 220 (e.g., without the volts unit) by a frequency at which processor 220 operates (e.g., without the hertz unit) to calculate a power characteristics score (e.g., a "Voltage×Frequency" score), as illustrated. In the illustrated example, processors 220 with a power characteristic score greater than or equal to 4.5 may be assigned to Bin 1. Similarly, processors 220 with a power characteristic score less than 4.5 and greater than 2.0 may be assigned to Bin 2, as illustrated. Finally, processors 220 with a power characteristic score less than or equal to 2.0 may be assigned to Bin 3, as illustrated.

The quantity of bins, the quantity of power characteristics, the power characteristics used to calculate the power characteristic score, the quantity of thresholds, and the threshold values illustrated in FIG. 6B are provided as an example. In some embodiments, bin manager 410 uses a different quantity of bins, a different quantity of power characteristics, different power characteristics used to calculate the power characteristic score, a different quantity of thresholds, and/or different threshold values than those illustrated in FIG. 6B. In some embodiments, bin manager 410 receives input from a user to determine the quantity of bins, the quantity of power characteristics, the power characteristics used to calculate the power characteristic score, the quantity of thresholds, and/or the threshold values used to assign processors 220 to bins.

Figure 7:
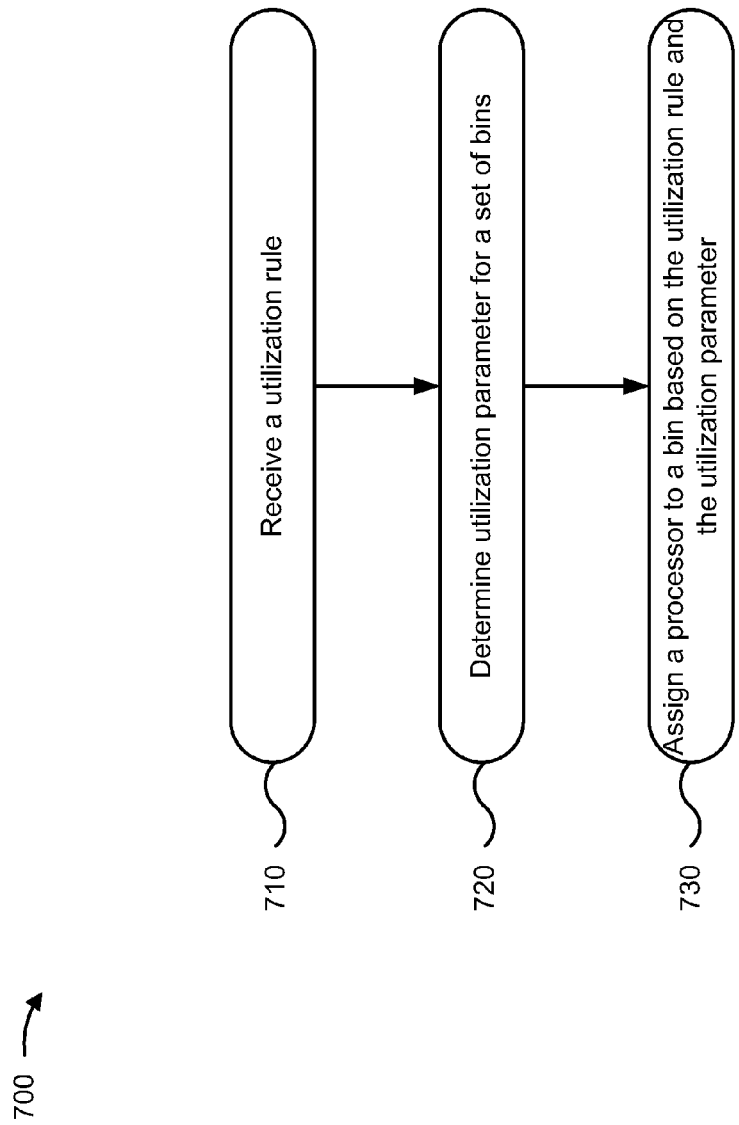
FIG. 7 is a diagram of another example process for assigning a processor to a bin, according to some embodiments.

FIG. 7 is a diagram of another example process 700 for assigning a processor to a bin, according to some embodiments. In some embodiments, one or more process blocks of FIG. 7 may be performed by one or more components of management device 230. Additionally, or alternatively, one or more process blocks of FIG. 7 may be performed by one or more components of another device or a collection of devices including or excluding management device 230.

As illustrated in FIG. 7, process 700 may include receiving a utilization rule (block 710). In some embodiments, bin manager 410 receives input, from a user, that identifies the utilization rule. Additionally, or alternatively, bin manager 410 may determine the utilization rule based on current and/or historical information, such as power characteristics, required processing power of a data center, etc. In some embodiments, the utilization rule identifies one or more threshold utilizations for one or more bins. Bin manager 410 may assign and/or reassign processors 220 to bins based on the thresholds. In some embodiments, the utilization rule identifies a threshold for one or more utilization parameters.

As further illustrated in FIG. 7, process 700 may include determining a utilization parameter for a set of bins (block 720). In some embodiments, bin manager 410 queries processors 220 regarding the utilization parameter, and may receive information that identifies the utilization parameter from processors 220. In some embodiments, the information that identifies the utilization parameter is received continuously and/or substantially continuously. In some embodiments, the information is received periodically (e.g., once per second, once per minute, once per hour, once a particular quantity of tasks have been assigned, once a particular quantity of clock cycles have elapsed, etc.).

The utilization parameter may include and/or may be based on a quantity of processors 220, in a particular bin, that are being used to process tasks; a fraction and/or a percentage of processors 220, in a particular bin, that are being used to process tasks; a quantity, fraction, and/or percentage of processors 220, in a particular bin, that are being used to process a particular task and/or a particular type of task; a power characteristic of a group of processors 220 assigned to a particular bin (e.g., a sum of voltages of processors, in the particular bin, being used to process tasks; a sum and/or product of frequencies of processors, in the particular bin, being used to process tasks; etc.); and/or any other parameter that may indicate how lightly or heavily processors 220 in a bin are being used.

In some embodiments, bin manager 410 uses one or more utilization parameters to derive another utilization parameter. For example, bin manager 410 may calculate an average of a utilization parameter measured at periodic intervals over a time period. For example, 50% of processors 220 in a particular bin may be processing tasks at time T=1, and 70% of processors 220 in the particular bin may be processing tasks at time T=2, for an average utilization of 60%.

As further illustrated in FIG. 7, process 700 may include assigning a processor to a bin based on the utilization rule and the utilization parameter (block 730). In some embodiments, bin manager 410 compares the utilization parameter to a threshold identified by the utilization rule, and may assign a processor 220 to a bin based on the comparison. For example, additional processors 220 may be assigned to a bin when the bin has a utilization greater than a threshold (e.g., more than two hundred processors 220 in the bin are being utilized, more than 90% of the processors 220 in the bin are being utilized, etc.). Similarly, processors 220, included in a bin that has a utilization below a threshold (e.g., fewer than thirty processors 220 in the bin are being utilized, less than 40% of the processors 220 in the bin are being utilized, etc.), may be assigned to a different bin and/or may be powered off (or placed in a reduced-power state, such as standby or hibernate). In some embodiments, bin manager 410 adjusts a power characteristic of processor 220 in order to reassign processor 220 to a different bin.

Figure 8:
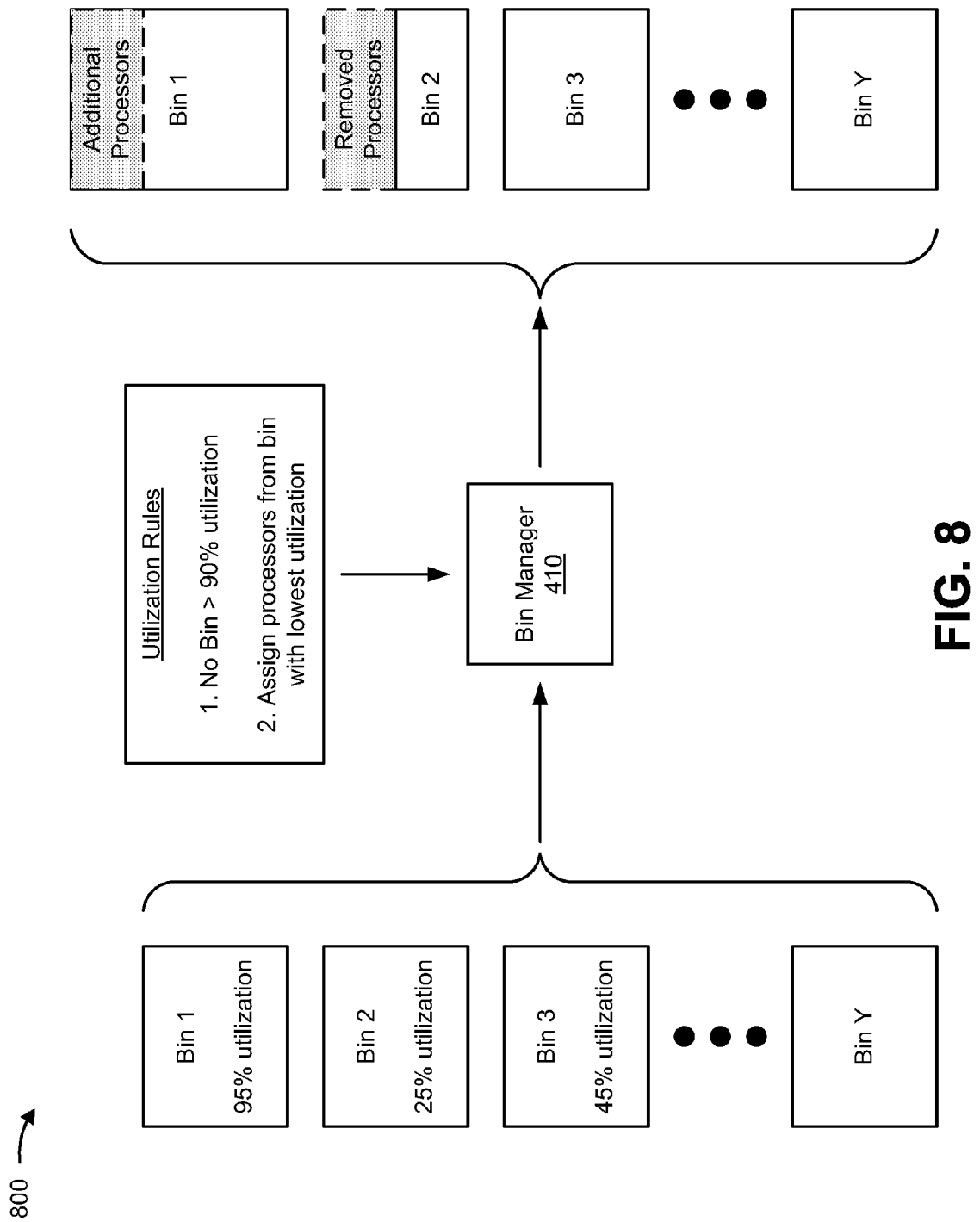
FIG. 8 is a diagram of an example embodiment relating to the example process illustrated in FIG. 7.

In some embodiments, bin manager 410 uses multiple utilization rules when assigning processors 220 to a bin and/or removing processors 220 from a bin, as described further in connection with FIG. 8.

While a series of blocks has been described with regard to FIG. 7, the order of the blocks may be modified in some embodiments. Additionally, or alternatively, non-dependent blocks may be performed in parallel.

FIG. 8 is a diagram of an example embodiment 800 relating to example process 700, illustrated in FIG. 7. FIG. 8 illustrates an embodiment that uses multiple utilization rules when assigning processors 220 to a bin and/or removing processors 220 from a bin.

As illustrated in FIG. 8, bin manager 410 may monitor the utilization of processors 220 in the bins, and may assign and/or reassign processors 220 to bins depending on the utilization of the bins and one or more utilization rules. For example, bin manager 410 may receive a utilization rule specifying that no bin may have a utilization of greater than 90%, and may receive a utilization rule specifying that processors are to be assigned from the bin with the lowest utilization, as illustrated. Bin manager 410 may receive an indication that Bin 1 has a 95% utilization, Bin 2 has a 25% utilization, and Bin 3 has a 45% utilization. In example embodiment 800, the utilization may indicate a percentage of processors 220, assigned to a particular bin, that are being used to process tasks.

Bin manager 410 may apply the received utilization rules to the bins. For example, Bin 1 has a utilization of 95%, which violates the first utilization rule specifying that no bin may have a utilization greater than 90%. Thus, bin manager 410 may assign additional processors 220, which are not being used to process tasks, to Bin 1 in order to comply with the first utilization rule. Bin manager 410 may use the second utilization rule to determine the bin from which processors 220 should be removed in order to be added to Bin 1. The second utilization rule specifies that processors 220 should be assigned from the bin with the lowest utilization, which is Bin 2 in example embodiment 800. Bin manager 410 may assign processors 220 from Bin 2 to Bin 1 to lower the utilization of Bin 1 to below 90%.

In some embodiments, bin manager 410 adjusts the power characteristics of processors 220 from Bin 2 when assigning the processors 220 to Bin 1. For example, referring back to FIG. 6A, processors 220 in Bin 2 may have a supplied voltage between 1.0 volts and 1.5 volts, and/or may have an operating frequency between 2.00 GHz and 3.00 GHz. As further illustrated in FIG. 6A, processors 220 in Bin 1 may have a supplied voltage greater than or equal to 1.5 volts, and/or may have an operating frequency greater than or equal to 3.00 GHz. When reassigning processors 220 from Bin 2 to Bin 1, bin manager 410 may increase the voltage supplied to processors 220 so that the voltage is greater than or equal to 1.5 volts, and/or may increase the operating frequency of processors 220 so that the frequency is greater than or equal to 3.00 GHz. Additionally, or alternatively, bin manager 410 may adjust the voltage and/or the frequency so that the power characteristic score (e.g., voltage×frequency) of processors 220 is greater than 4.5 (e.g., as illustrated by Bin 1 in FIG. 6B).

The quantity of bins, the utilization parameter, the quantity of utilization rules, the particular utilization rules used, and the threshold value illustrated in FIG. 8 are provided as an example. In some embodiments, bin manager 410 uses a different quantity of bins, a different utilization parameter, a different quantity of utilization rules, a different utilization rule, and/or a different threshold value than those illustrated in FIG. 8. In some embodiments, bin manager 410 receives input from a user to determine the quantity of bins, the utilization parameter, the quantity of utilization rules, the particular utilization rules used, and the threshold value used to assign processors 220 to a bin.

Figure 9:
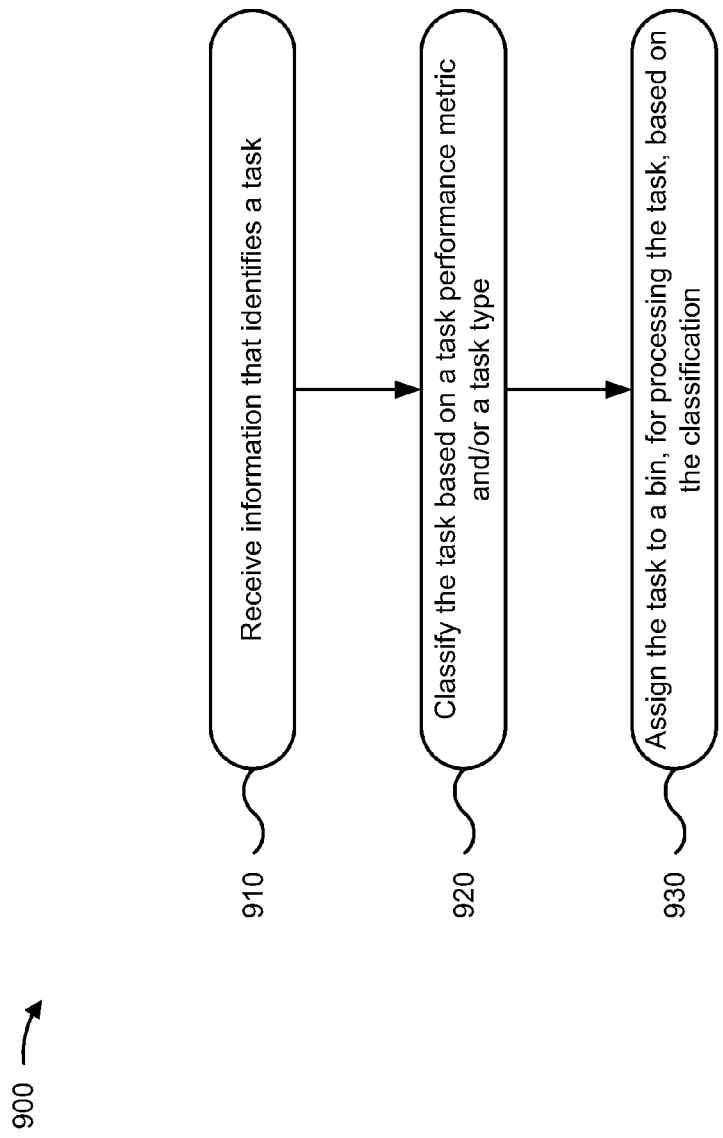
FIG. 9 is a diagram of an example process for assigning a task to a bin for processing the task, according to some embodiments.

FIG. 9 is a diagram of an example process 900 for assigning a task to a bin for processing the task, according to some embodiments. In some embodiments, one or more process blocks of FIG. 9 may be performed by one or more components of management device 230. Additionally, or alternatively, one or more process blocks of FIG. 9 may be performed by one or more components of another device or a collection of devices including or excluding management device 230.

As illustrated in FIG. 9, process 900 may include receiving information that identifies a task (block 910). In some embodiments, task scheduler 420 receives information that identifies a task to be performed in data center 210 by a processor 220. In some embodiments, task scheduler 420 receives information that identifies a task from a device included in data center 210. Additionally, or alternatively, task scheduler 420 may receive information that identifies a task from a device not included in data center 210.

As further illustrated in FIG. 9, process 900 may include classifying the task based on a task performance metric and/or a task type (block 920). In some embodiments, task scheduler 420 classifies the task into a classification along a spectrum of tasks requiring light processing power and tasks requiring heavy processing power. At one end of the spectrum, a task requiring light processing power may include an input/output-bound task, such as a task that only (or primarily) includes reading information from and/or writing information to memory. When information is being read from or written to memory, processor 220 may be idle, and increasing the processing power of processor 220 may not result in processing the input/output-bound task in less time. At the other end of the spectrum, a task requiring heavy processing power may include a processor-bound task, such as a task that only (or primarily) includes processing information, with no (or few) read/write operations. Increasing the processing power of processor 220 results in processing the processor-bound task in less time.

Task scheduler 420 may create any quantity of classifications along the spectrum for task classification. The classifications may indicate that a task is more input/output-bound (e.g., includes primarily read/write operations), or more processor-bound (e.g., includes primarily processing operations). In some embodiments, the quantity of classifications is equal to the quantity of bins.

In some embodiments, a classification is associated with an upper threshold and/or a lower threshold for a task performance metric. Task scheduler 420 may receive and/or calculate a task performance metric periodically. The task performance metric may indicate an amount of processing power required to process a task (e.g., in a particular amount of time). Additionally, or alternatively, the task performance metric may include a measurement of an event that occurs while processor 220 is processing one or more tasks. Additionally, or alternatively, the task performance metric may include an indication of a behavior of a processor 220 while processing one or more tasks.

In some embodiments, a task performance metric includes and/or is based on an instruction count, which may indicate a quantity of instructions executed by processor 220 when processing a task (e.g., a quantity of instructions executed). The instruction count may be counted over a time period (e.g., a clock cycle, a bus cycle, a nanosecond, a millisecond, a microsecond, a second, a minute, etc.), which may be referred to herein as an "instruction rate."

A high instruction count and/or rate for a task (e.g., a quantity of instructions, greater than a threshold, executed over a particular time period when processing the task) may indicate that the task requires high processing power (e.g., is more processor-bound). A low instruction count and/or rate for a task (e.g., a quantity of instructions, less than a threshold, executed over the particular time period when processing the task) may indicate that the task requires low processing power (e.g., is more input/output-bound).

Additionally, or alternatively, a task performance metric may include and/or may be based on a cache miss count, which may indicate a quantity of times, while processing a task, that processor 220 writes information to and/or reads information from main memory, rather than to and/or from cache memory (e.g., a quantity of times that information requested by processor 220 is not contained in cache memory). For example, main memory may include random access memory, may have a greater storage capacity than cache memory, may be located further away from processor 220 when compared to cache memory, and/or may require a longer amount of time to access by processor 220 when compared to cache memory. Cache memory may store information that is a duplicate of information stored in main memory. The quantity of cache misses may be counted over a time period (e.g., a clock cycle, a bus cycle, a microsecond, a second, etc.), which may be referred to herein as a "cache miss rate." In some embodiments, a cache miss count and/or rate may be calculated for an instruction cache, a data cache, and/or a translation lookaside buffer. Additionally, or alternatively, a cache miss count and/or rate may be calculated for any level of cache memory (e.g., primary cache, secondary cache, etc.) in a multi-cache hierarchy.

A high cache miss count and/or rate for a task (e.g., greater than a threshold) may indicate that the task requires low processing power (e.g., is more input/output-bound). A low cache miss count and/or rate for a task (e.g., less than a threshold) may indicate that the task requires high processing power (e.g., is more processor-bound).

Additionally, or alternatively, a task performance metric may include and/or may be based on a cache hit count, which may indicate a quantity of times, while processing a task, that processor 220 references, writes information to, and/or reads information from cache memory (e.g., a quantity of times that information requested by processor 220 is contained in cache memory). The quantity of cache hits may be counted over a time period (e.g., a clock cycle, a bus cycle, a microsecond, a second, etc.), which may be referred to herein as a "cache hit rate." In some embodiments, a cache hit count and/or rate may be calculated for an instruction cache, a data cache, and/or a translation lookaside buffer. Additionally, or alternatively, a cache hit count and/or rate may be calculated for any level of cache memory (e.g., primary cache, secondary cache, etc.) in a multi-cache hierarchy.

A high cache hit count and/or rate for a task (e.g., greater than a threshold) may indicate that the task requires high processing power (e.g., is more processor-bound). A low cache hit count and/or rate for a task (e.g., less than a threshold) may indicate that the task requires low processing power (e.g., is more input/output-bound).

In some embodiments, a task performance metric includes and/or is based on a ratio of cache hits to cache misses, and/or a ratio of cache misses to cache hits. Additionally, or alternatively, the task performance metric may include and/or may be based on a ratio of cache hit rate to cache miss rate, and/or a ratio of cache miss rate to cache hit rate. Additionally, or alternatively, the cache miss rate may be calculated as a fraction and/or a percentage of cache misses (e.g., a quantity of cache misses per attempted cache accesses). Additionally, or alternatively, the cache hit rate may be calculated as a fraction and/or a percentage of cache hits (e.g., a quantity of cache hits per attempt cache accesses).

In some embodiments, the task performance metric includes and/or is based on a page fault count, which may indicate a quantity of times, while processing a task, that processor 220 accesses and/or attempts to access a page (e.g., a contiguous block of virtual memory) that is mapped to virtual memory (e.g., in a virtual address space), but is not loaded in physical memory (e.g., random access memory). The page fault count be counted over a time period (e.g., a clock cycle, a microsecond, a second, etc.), which may be referred to herein as a "page fault rate." In some embodiments, a page fault count and/or rate may be calculated based on hard page faults (e.g., the page is not loaded into physical memory when the fault is generated) and/or soft page faults (e.g., the page is loaded in physical memory at the time the fault is generated, but is not marked in a memory management unit as being loaded into physical memory and/or is located in a different location in physical memory than expected by the memory management unit).

A high page fault count and/or rate for a task (e.g., greater than a threshold) may indicate that the task requires low processing power (e.g., is more input/output-bound). A low page fault count and/or rate for a task (e.g., less than a threshold) may indicate that the task requires high processing power (e.g., is more processor-bound).

In some embodiments, the task performance metric includes and/or is based on a context switch count, which may indicate a quantity of times, while processing a task, that processor 220 interrupts a processing task and/or switches to another processing task. For example, a task context may refer to a minimum set of information, associated with the task, that must be saved to allow the task to be interrupted at a particular time (e.g. while another task is being processed) and resumed at another time. The context switch count may indicate a quantity of times that the minimum set of information is stored and/or restored by processor 220. The context switch count be counted over a time period (e.g., a clock cycle, a bus cycle, a microsecond, a second, etc.), which may be referred to herein as a "context switch rate."

A high context switch count and/or rate for a task (e.g., greater than a threshold) may indicate that the task requires low processing power (e.g., is more input/output-bound). A low context switch count and/or rate for a task (e.g., less than a threshold) may indicate that the task requires high processing power (e.g., is more processor-bound).

In some embodiments, the task performance metric includes and/or is based on a processor idle time, which may indicate an amount of time (e.g., measured in clock cycles, nanoseconds, microseconds, seconds, etc.) that processor 220 is idle (e.g., not being used to process a task) while processing a task. The processor idle time may be measured over a particular time period (e.g., a clock cycle, a bus cycle, a microsecond, a second, etc.), which may be referred to herein as a "processor idle time rate."

A high processor idle time and/or a high processor idle time rate for a task (e.g., greater than a threshold) may indicate that the task requires low processing power (e.g., is more input/output-bound). A low processor idle time and/or rate for a task (e.g., less than a threshold) may indicate that the task requires high processing power (e.g., is more processor-bound).

In some embodiments, the task performance metric includes and/or is based on a processor idle count, which may indicate a quantity of times, while processing a task, that processor 220 is placed into an idle state. The processor idle count may be measured over a particular time period (e.g., a clock cycle, a second, etc.), which may be referred to herein as a "processor idle count rate."

A high processor idle count and/or a high processor idle count rate for a task (e.g., greater than a threshold) may indicate that the task requires low processing power (e.g., is more input/output-bound). A low processor idle time and/or rate for a task (e.g., less than a threshold) may indicate that the task requires high processing power (e.g., is more processor-bound).

In some embodiments, the task performance metric includes and/or is based on a branch instruction count, which may indicate a quantity of branch instructions executed by processor 220 while processing a task. A branch instruction may refer to an instruction that causes processor 220 to execute (e.g., branch to) another instruction. The quantity of branch instructions may be counted over a time period (e.g., a clock cycle, a microsecond, a second, etc.), which may be referred to herein as a "branch instruction rate."

In some embodiments, the task performance metric includes and/or is based on a quantity of branch instruction misses (e.g., a quantity of branch instructions not found by processor 220 in memory while executing a task, a quantity of branch instructions not able to be executed by processor 220 while executing the task, etc.), a branch instruction miss rate, a quantity of branch instruction mispredictions (e.g., a quantity of branch instructions mispredicted by processor 220 while processing a task), a branch instruction misprediction rate, a quantity of processor migrations (e.g., a quantity of times that a task is moved from one processor 220 to another processor 220 during execution), a processor migration rate, a memory controller bandwidth (e.g., a flow rate of information flowing to and from main memory, such as RAM, while processing a task), a memory controller bandwidth utilization (e.g., a fraction and/or percentage of memory controller bandwidth being utilized while processing a task), a page hit count (e.g., a quantity of times that processor 220 retrieves information from virtual memory while processing a task), a page hit rate, a page call count (e.g., a quantity of times that processor 220 attempts to access information from virtual memory while processing a task), a page call rate, etc.

In some embodiments, task scheduler 420 determines a task performance metric for an instruction cache, a data cache, and/or a translation lookaside buffer. Additionally, or alternatively, task scheduler 420 may calculate the task performance metric for any level of cache memory (e.g., primary cache, secondary cache, etc.) in a multi-cache hierarchy.

In some embodiments, task scheduler 420 classifies a task into a classification based on an upper threshold and/or a lower threshold for a task performance metric. For example, a task that causes processor 220, while executing the task, to execute fewer than ten million (10,000,000) instructions per second may be classified into a first classification (e.g., input/output-bound). Likewise, a task that causes processor 220, while executing the task, to execute more than ten million (10,000,000) instructions per second may be classified into a second classification (e.g., processor-bound).

Additionally, or alternatively, task scheduler 420 may classify a task into a classification based on multiple task performance metrics. For example, a task that causes processor 220, while executing the task, to execute fewer than ten million (10,000,000) instructions per second, and/or to switch contexts more than one thousand (1,000) times per second, may be classified into a first classification (e.g., input/output-bound). A task that causes processor 220, while executing the task, to execute more than ten million (10,000,000) instructions per second, and/or to switch contexts fewer than one thousand (1,000) times per second, may be classified into a second classification (e.g., processor-bound).

Additionally, or alternatively, task scheduler 420 may classify a task into a classification based on multiple thresholds for a task performance metric and/or multiple thresholds for multiple task performance metrics. For example, a task that causes processor 220, while executing the task, to have a cache miss rate less than or equal to one percent (1%), and/or that causes processor 220 to have a page fault rate less than or equal to five (5) page faults per second, may be classified into a first classification (e.g., processor-bound). Similarly, a task that causes processor 220, while executing the task, to have a cache miss rate greater than one percent (1%) and less than five percent (5%), and/or that causes processor 220 to have a page fault rate greater than five (5) page faults per second and less than twenty (20) page faults per second, may be classified into a second classification (e.g., intermediate). Finally, a task that causes processor 220, while executing the task, to have a cache miss rate greater than or equal to five percent (5%), and/or that causes processor 220 to have a page fault rate greater than or equal to twenty (20) page faults per second, may be classified into a third classification (e.g., input/output-bound).

In some embodiments, task scheduler 420 classifies a task into a classification using a task performance score based on one or more task performance metrics and/or one or more weights. For example, task scheduler 420 may use the following equation to calculate a task performance score:

$$\text{Task Performance Score} = (A_1 \times \text{instruction count}) + (A_2 \times \text{cache miss count}) + (A_3 \times \text{clock cycles elapsed}) + (A_4 \times \text{page fault count}) + (A_5 \times \text{context switch count}) + A_6.$$

In the equations described herein, each of $A_1$ through $A_6$ may represent a weight applied to each task performance metric. In some embodiments, one or more weights may be equal to zero (0), may be equal to one (1), may be equal to one or more other weights, and/or may be different from one or more other weights. Additionally, or alternatively, task scheduler 420 may adjust the weights, when calculating a task performance score, based on a particular processor 220 (e.g. including in a particular bin) from which the task performance metrics are obtained. Additionally, or alternatively, a weight may be specified by a user, and/or may be adjusted based on data center performance.

"Clock cycles elapsed" may refer to the quantity of clock cycles that have elapsed while counting the instruction count, the cache miss count, the page fault count, and/or the context switch count.

In some embodiments, task scheduler 420 uses the following equation to calculate a task performance score:

$$\text{Task Performance Score} = (A_1 \times \text{instruction rate}) + (A_2 \times \text{cache hit rate}) + (A_3 \times \text{page fault rate}) + (A_4 \times \text{context switch rate}) + (A_5 \times \text{processor idle rate}) + A_6.$$

The above equations are provided as examples. In practice, the task performance score may be calculated based on any combination of weighted or unweighted task performance metrics.

In some embodiments, task scheduler 420 classifies a task based on a task type of the task. The task type may identify an amount of processing power required to process a task. A particular task type may be classified along the spectrum of heavy processing tasks and light processing tasks. For example, a processor 220 executing a "map" task may take an input, divide the input into sub-problems, and distribute the sub-problems to be performed by one or more processors 220. As another example, a processor 220 executing a "reduce" task may collect answers to all of the sub-problems, and may analyze and/or combine the answers to generate an output. Task scheduler 420 may classify a task with a task type of "map" into a light processing classification, and may classify a task with a task type of "reduce" into a heavy processing classification.

In some embodiments, task scheduler 420 determines a classification for a task type based on one or more task performance metrics associated with the task type. For example, processors 220 may execute a task of a particular task type, and task scheduler 420 may calculate, based on the execution of the task, a performance metric for the particular task type. Task scheduler 420 may classify tasks of the particular task type based on the performance metric. Task scheduler 420 may use a single performance metric, multiple performance metrics, and/or a task performance score to classify tasks of a particular task type.

In some embodiments, task scheduler 420 calculates an average performance metric for multiple tasks executed by processors 220. Additionally, or alternatively, the average performance metric may be associated with a particular task type. For example, task scheduler 420 may calculate an average instruction count and/or rate for multiple tasks of a particular task type. Task scheduler 420 may classify tasks of the particular task type based on the average performance metric. Task scheduler 420 may use a single average performance metric, multiple average performance metrics, and/or an average task performance score to classify tasks of a particular task type.

Returning to FIG. 9, process 900 may include assigning the task to a bin, for processing the task, based on the classification (block 930). In some embodiments, a task requiring heavy processing power is assigned to a bin that includes processors 220 receiving a high supplied voltage (e.g., higher than a threshold) and/or that includes processors 220 operating at a high frequency (e.g., higher than a threshold). Similarly, a task requiring light processing power may be assigned to a bin that includes processors 220 receiving a low supplied voltage (e.g., lower than a threshold) and/or that includes processors 220 operating at a low frequency (e.g., lower than a threshold).

In some embodiments, task scheduler 420 assigns a first task to a first bin and/or a first processor 220, and calculates a task performance metric and/or a task performance score based on execution of the first task. Task scheduler 420 may re-assign the first task to a second bin and/or a second processor 220, for processing the first task, based on the calculated task performance metric and/or task performance score. Additionally, or alternatively, task scheduler 420 may assign a second task (e.g., an incoming task) to the second bin and/or the second processor 220 based on the second task having the same task type as the first task.

While a series of blocks has been described with regard to FIG. 9, the order of the blocks may be modified in some embodiments. Additionally, or alternatively, non-dependent blocks may be performed in parallel.

Figure 10:
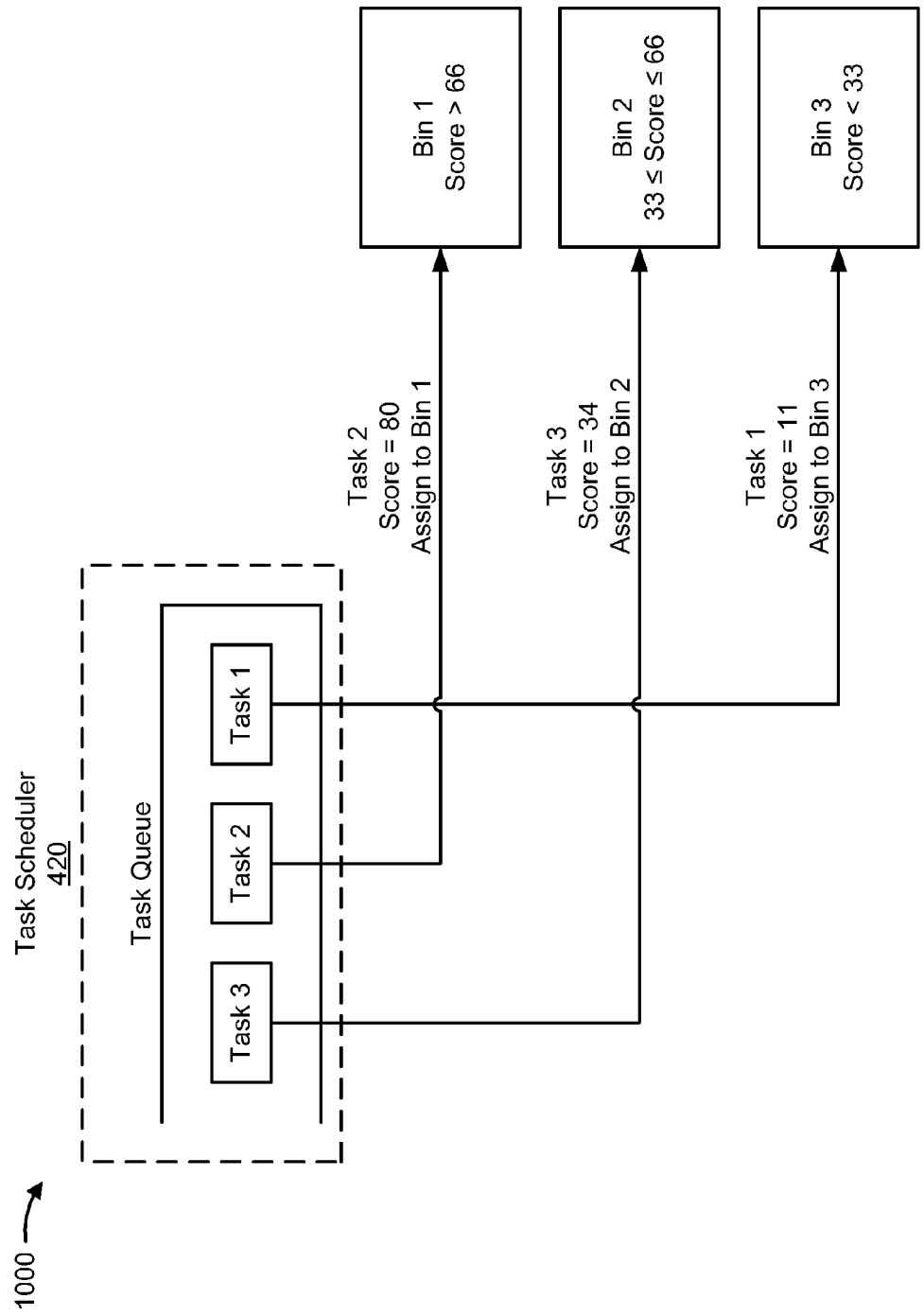
FIG. 10 is a diagram of an example embodiment relating to the example process illustrated in FIG. 9.

FIG. 10 is a diagram of an example embodiment 1000 relating to example process 900, illustrated in FIG. 9. In example embodiment 1000, task scheduler 420 calculates a task performance score for an incoming task, and assigns the task to one of three bins based on the task performance score. A task with a task performance score greater than sixty-six (66) is assigned to Bin 1. A task with a task performance score less than or equal to sixty-sixty (66) and greater than or equal to thirty-three (33) is assigned to Bin 2. A task with a task performance score less than thirty-three (33) is assigned to Bin 3. In example embodiment 1000, Bin 1 receives tasks requiring the heaviest processing, and Bin 3 receives tasks requiring the least processing. For example, Bins 1-3 in FIG. 10 may correspond to Bins 1-3 in FIG. 6A and/or FIG. 6B.

In example embodiment 1000, assume that task scheduler 420 calculates the task performance score based on the following equation:

Task Performance Score=(instruction rate)+($A_1$/page fault rate), where $A_1$=20, the instruction rate is measured in million instructions per second ("MIPS"), and the page fault rate is measured in quantity of page faults per second ("pfs").

Assume that Task 1 has an instruction rate of ten (10) MIPS, and a page fault rate of twenty (20) pfs. The task performance score for Task 1 is eleven (10+20/20=11), and Task 1 is assigned to a processor 220 included in Bin 3.

Assume that Task 2 has an instruction rate of seventy (70) MIPS, and a page fault rate of two (2) pfs. The task performance score for Task 2 is eighty (70+20/2=80), and Task 2 is assigned to a processor 220 included in Bin 1.

Assume that Task 3 has an instruction rate of thirty (30) MIPS, and a page fault rate of five (5) pfs. The task performance score for Task 3 is thirty-four (30+20/5=34), and Task 3 is assigned to a processor 220 included in Bin 2.

The quantity of bins, the quantity of tasks, the task performance scores, the threshold values of the task performance score for each bin, and the performance metrics and weights used to calculate the performance scores discussed in connection with FIG. 10 are provided as an example. In some embodiments, task scheduler 420 may receive a different quantity of tasks, may assign tasks to a different quantity of bins, may use a different equation to calculate performance scores, may use different performance metrics and weights to calculate performance scores, and may use different threshold values to assign tasks to bins than those discussed in connection with FIG. 10. In some embodiments, task scheduler 420 may receive input from a user to determine the quantity of bins, the equation to calculate performance scores, and/or the performance metrics and weights to use when calculating performance scores.

Embodiments described herein may reduce energy costs of a data center by managing power characteristics of data center processors based on the processing tasks that are performed by the processors. Embodiments described herein may also increase efficiency of a data center by assigning tasks to appropriate processors for performing the tasks.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

Some embodiments are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms.

It will be apparent that systems and/or methods, as described herein, may be implemented in many different forms of software, firmware, and hardware in the embodiments illustrated in the figures. The actual software code or specialized control hardware used to implement these systems and/or methods is not limiting of the embodiments. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible embodiments. In fact, many of these features may be combined in ways not specifically recited in the claims and/or disclosed in the specification. Although each dependent claim listed below may directly depend on only one claim, the disclosure of possible embodiments includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
   receiving, by a device, information that identifies a first task to be processed;
   determining, by the device, a performance metric value associated with processing the first task,
      the performance metric value being indicative of a behavior of a processor;
   classifying, by the device and based on the performance metric value, the first task into a task that is associated with a first processing power or a task that is associated with a second processing power,
      the second processing power exceeding the first processing power,
      the performance metric value comprising at least one of:
         a quantity of instructions executed by the processor during a particular time period, while processing a second task,
         a cache miss rate indicating a quantity of times that information, requested by the processor while processing the second task, was not available in a cache during the particular time period,
         a cache hit rate indicating a quantity of times that information, requested by the processor while processing the second task, was available in the cache during the particular time period, or
         a page fault rate indicating a quantity of times that the processor, while processing the second task, attempts to access a page, that is mapped to virtual memory but is not loaded in physical memory, during the particular time period; and
   assigning, by the device, the first task to a bin for processing the first task based on classifying the first task,
      the bin including a set of processors that operate based on a power characteristic,
      the power characteristic being associated with one of the first processing power or the second processing power.

2. The method of claim 1, where the power characteristic comprises at least one of:
   a supplied voltage within a particular range of voltages, or
   a frequency within a particular range of frequencies.

3. The method of claim 2, further comprising:
   assigning an available processor to the bin by:

setting a voltage supplied, to the available processor, to a voltage within the particular range of voltages, or setting an operating frequency, of the available processor, to an operating frequency within the particular range of frequencies.

4. The method of claim 1, where the power characteristic is based on a type of task processed by the set of processors.

5. The method of claim 1, where the power characteristic is based on at least one of:

an amount of power consumed by the set of processors while processing a task, or an amount of power estimated to be consumed by the set of processors while processing a task.

6. The method of claim 1, where assigning the first task to the bin for processing the first task comprises:

calculating a performance score based on the performance metric value and another performance metric value;

comparing the performance score to a threshold; and assigning the first task to the bin based on comparing the performance score to the threshold.

7. The method of claim 1, where assigning the first task to the bin for processing the first task comprises:

identifying a first task type associated with the first task; and assigning the first task to the bin based on the first task type.

8. The method of claim 1, where the performance metric value comprises at least two of:

the quantity of instructions executed by the processor during the particular time period, the cache miss rate, the cache hit rate, the page fault rate, a quantity of times that the processor interrupts the processing of the second task to process another task during the particular time period, an amount of time, during the particular time period, that the processor is idle, while processing the second task, a quantity of times, during the particular time period, that the processor is placed in an idle state, while processing the second task, a quantity of branch instructions executed, during the particular time period, by the processor, while processing the second task, or a quantity of times, during processing of the second task and during the particular time period, that the second task is moved from the processor to another processor for processing the second task.

9. The method of claim 8, further comprising:

assigning a third task to another bin for processing the third task, the third task being associated with another one of the first processing power or the second processing power, the bin including a set of processors that operate based on another power characteristic, and the other power characteristic being associated with the other one of the first processing power or the second processing power.

10. A device, comprising:

one or more processors to:

receive information that identifies a first task to be processed;

determine a performance metric value associated with processing the first task;

determine, based on the performance metric value, whether processing the first task requires first processing power or second processing power, the first processing power being different than the second processing power, the performance metric value comprising at least one of:

a quantity of times that processing of a second task is interrupted to process another task during a particular time period, a quantity of branch instructions executed, during the particular time period while processing the second task, or a quantity of times, during processing of the second task and during the particular time period, that the second task is moved from one processor to another processor for processing the second task; and selectively assign the task to:

a first bin of processors for processing when processing the first task requires the first processing power, or a second bin of processors for processing when processing the first task requires the second processing power, processors, of the first bin of processors, operating based on a power characteristic associated with the first processing power, and processors, of the second bin of processors, operating based on another power characteristic associated with the second processing power.

11. The device of claim 10, where the power characteristic comprises at least one of:

a supplied voltage within a particular range of voltages, or a frequency within a particular range of frequencies.

12. The device of claim 11, where the one or more processors are further to:

set a voltage supplied, to an available processor, to a voltage within the particular range of voltages;

set an operating frequency, of the available processor, to an operating frequency within the particular range of frequencies; and assign the available processor to the first bin of processors based on setting the voltage supplied to the available processor and setting the operating frequency of the available processor.

13. The device of claim 10, where the power characteristic is based on a type of task processed by the first bin of processors.

14. The device of claim 10, where the power characteristic is based on at least one of:

an amount of power consumed by the processor, of the first bin of processors, while processing a task, or an amount of power estimated to be consumed by the processor while processing the task.

15. The device of claim 10, where the one or more processors are further to:

assign an available processor to the second bin of processors based on a utilization parameter, associated with the first bin of processors or the second bin of processors, satisfying a threshold, the utilization parameter including at least one of:

a quantity of processors, in the first bin of processors or the second bin of processors, that are being used to process tasks, a fraction of the processors, in the first bin of processors or the second bin of processors, that are being used to process tasks, or a quantity of the processors, in the first bin of processors or the second bin of processors, that are being used to process at least one of a particular task or a particular type of task.

16. The device of claim 10, where:
the first bin of processors operate within a first range of supplied voltages or operate within a first range of frequencies;
the second bin of processors operate within a second range of supplied voltages or operate within a second range of frequencies;
the first range of supplied voltages is different from the second range of supplied voltages; and
the first range of frequencies is different from the second range of frequencies.

17. The device of claim 10, where the one or more processors, when selectively assigning the first task, are further to:
calculate a performance score based on the performance metric value and another performance metric value;
compare the performance score to a threshold; and
assign the first task to the first bin of processors based on comparing the performance score to the threshold.

18. The device of claim 10, where the one or more processors, when selectively assigning the first task, are further to:
receive information that identifies a task type of the first task; and
assign the first task to the first bin of processors based on the task type.

19. The device of claim 10, where the first task is selectively assigned to reduce energy cost associated with the first bin of processors and the second bin of processors, and
where the performance metric value further comprises at least one of:
a quantity of instructions executed during the particular time period, while processing the second task,
a cache miss rate indicating a quantity of times that information, requested while processing the second task, was not available in a cache during the particular time period,
a cache hit rate indicating a quantity of times that information, requested while processing the second task, was available in the cache during the particular time period, or
a page fault rate indicating a quantity of attempted accesses to a page, that is mapped to virtual memory but is not loaded in physical memory, during the particular time period, while processing the second task.

20. A method, comprising:
determining, by a device, a first power characteristic value at which a processor is capable of operating,
the first power characteristic value comprising at least one of:
a voltage supplied to the processor, or
a frequency at which the processor operates;
determining, by the device, a range of second power characteristic values associated with each bin of a plurality of bins,
the range of second power characteristic values, associated with each bin of the plurality of bins, including a range of voltage supplied to processors of the bin,
each bin, of the plurality of bins, comprising a group of processors operating using a particular power characteristic value; and
assigning, by the device, the processor to a first bin, of the plurality of bins, by adjusting the first power characteristic value of the processor to a power characteristic value within the range of the second power characteristic values associated with the first bin,
a voltage supplied to the group of processors, of the first bin, exceeding a voltage supplied to the group of processors of a second bin of the plurality of bins,
a task being assigned to:
the second bin for processing when the task requires a first processing power, or
the first bin for processing when the task requires a second processing power exceeds processing the first rocessing power.

21. The method of claim 20, where assigning the processor to the first bin comprises:
receiving a utilization rule; and
assigning the processor to the first bin based on the utilization rule.

22. The method of claim 21, where the utilization rule specifies a first condition for adding the processor to the first bin, and a second condition for removing the processor from the second bin; and
where assigning the processor to the first bin comprises:
removing the processor from the second bin based on the second condition being satisfied, and
adding the processor to the first bin based on the first condition being satisfied.

23. The method of claim 20, where assigning the processor to the first bin comprises:
receiving a utilization parameter value that indicates a quantity or a fraction of processors, included in the first bin, that are processing a task;
comparing the utilization parameter value to a threshold; and
assigning the processor to the first bin based on comparing the utilization parameter value to the threshold.

24. The method of claim 20, further comprising:
receiving information that identifies the task;
determining a performance metric value indicative of an amount of processing power required to process the task;
comparing the performance metric value to a threshold; and
assigning the task to the processor assigned to the first bin based on comparing the performance metric value to the threshold.

25. The method of claim 24, where the performance metric value comprises at least one of:
a quantity of instructions executed during a particular time period, while processing a particular task;
a cache miss rate indicating a quantity of times that information requested, while processing the particular task, was not available in a cache during the particular time period;
a cache hit rate indicating a quantity of times that information requested, while processing the particular task, was available in the cache during the particular time period;
a page fault rate indicating a quantity of attempted accesses to a page, that is mapped to virtual memory, but is not loaded in physical memory, during the particular time period, while processing the particular task; or
a quantity of times that the processing of the particular task is interrupted to process another task during the particular time period.

* * * * *